United States Patent Office 3,443,727
Patented May 13, 1969

3,443,727
GUIDELINE LAWN MARKER
Walker L. Wellford, Jr., 135 St. Albans Fairway,
Memphis, Tenn. 38111
Filed Oct. 24, 1967, Ser. No. 677,598
Int. Cl. B67d *5/64;* A01c *5/00*
U.S. Cl. 222—162         10 Claims

ABSTRACT OF THE DISCLOSURE

A clamp-on guideline marker accessory for lawn sreaders in the form of a rotatable, hollow cylinder wheel containing lime powder or similar visible marking material in which the rotations of the wheel, as the spreader is advanced along a row, cause a spring plunger valve, located on the periphery of the wheeled container, to be depressed as it contacts the ground so as to dispense the marking contents at spaced intervals. In one embodiment a pivotable connection of the marker to the spreader enables the accessory to be swung over 180° so as to facilitate the maintenance of a constant spacing between rows as the spreader is advanced back and forth over the lawn area.

Background of the invention

The present invention relates to a guideline marker accessory attachable to devices such as lawn or field spreaders of fertilizer, seeds and chemicals. While such devices are well known in the art, the guideline markers of the present invention contains certain important and novel advantages over conventional designs.

In prior markers the containers for the visible marking substance (e.g., lime powder) is typically provided with one or more apertures for the dispensing of the contents onto the ground. The dispensing outlet either is open at all times to the atmosphere or, alternatively, is closed by a valve which is manually actuatable for opening the container at intervals, as desired. In the former type, because moisture, humid air and foreign matter is permitted free entry into the container, the contents tend to cake up and the marker dispenser becomes clogged, unless frequent maintenance and servicing is provided. In the latter type the operation of the dispenser valve is controlled by an operator and, because of the normal variations due to human error, such devices produce row markings of uneven length and at irregular intervals.

The present invention is directed to a novel and improved design for a guideline marker which provides hermetic protection of the powder or liquid contents and which automatically dispenses the marking substance in uniform size deposits at regular predetermined intervals as the spreader is advanced along a row.

Summary of the invention

The row marker of the present invention is a clamp-on accessory for a lawn or field spreader which principally comprises a hollow cylindrical wheel containing a visible marking powder or liquid material. The rotations of the wheel, as the spreader is advanced along the row, cause a spring plunger valve, located on the periphery of the wheeled container, to be depressed as it contacts the ground so as to dispense the marking contents in uniform deposits at regular spaced intervals. Except for the brief periods when the valve of the container is opened, the marking contents are kept under hermetic conditions, thus preventing the entry of moisture and foreign matter which could cause caking or other fouling problems in the operation of the marker device.

In a first embodiment of the invention, the wheeled cylinder containing the marking substance is provided with a dispensing valve in the form of a radially-mounted coil spring, and the marker accessory is rigidly coupled to the spreader. In a modification the valving action is provided by a leaf spring mounted on the inside periphery of the wheel container. In a second embodiment a pivotable connection of the marker accessory to the spreader is provided so that the device can be rapidly swung over from one side of the spreader to the other, if desired, so as to maintain constant spacing between rows as the spreader moves alternately back and forth over the lawn or field being treated.

The foregoing and other objects, features and advantages of the invention will be more readily understood from a consideration of the following detailed description of preferred embodiments of the invention, as illustrated in the accompanying drawings.

Description of the preferred embodiments

Figure 1:
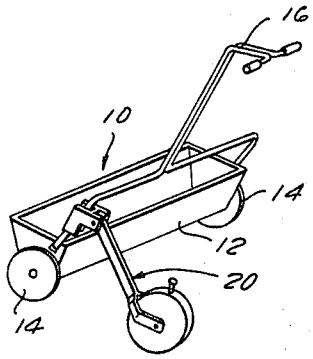
FIG. 1 is a perspective view of a first embodiment of the marker accessory of the present invention attached to a spreader.

Referring initially to FIG. 1 a typical spreader 10 is illustrated which is in the form of a hopper 12 supported on a pair of wheels 14. The marker accessory, generally designated as 20, is clamped to a suitable portion of the spreader 10, such as an element of the handle bar 16, and is aligned to trail along behind the spreader as it is advanced along the ground.

Figure 2:
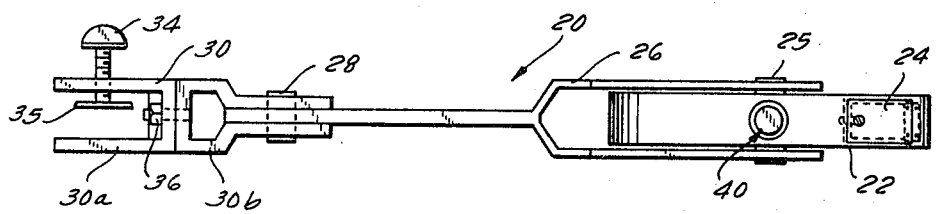
FIG. 2 is a top view of the marking accessory on an enlarged scale and removed from the spreader.
Figure 3:
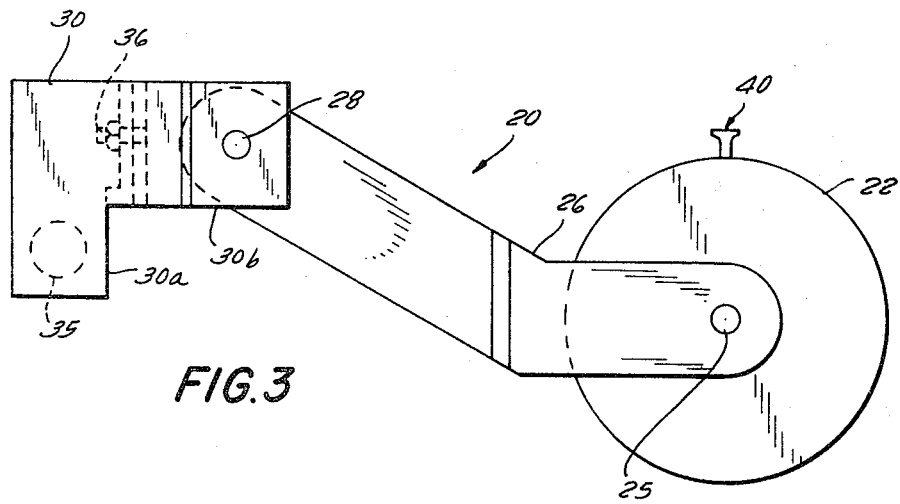
FIG. 3 is a side view of the marking accessory.

The marker accessory itself, as best shown in FIGS. 2 and 3, comprises a wheel-like hollow container 22 in the form of a squat cylinder of about one foot diameter and two-inch thickness. The container 22 is filled, via a recessed door latch 24, with a suitable visible marking substance, either powder or liquid, such as lime. If desired, when powder is used a small block of stone or metal may be placed inside the wheel so as to tumble around and thereby prevent the material from caking.

The wheeled container 22 is pivotally supported at its center 25 by the angled U-shaped end of a yoke member 26. The base end of the yoke member 26 is connected by a hinge pin 28 to a clamping connector 30 fitted with a suitable fastening means for securing to the spreader, such as thumb screw 34 fitted with a swivel plate 35 to prevent marring. For ease of fabrication the clamping connector may be formed of two portions 30a, 30b, as shown, fastened together by bolting means 36. The coupling of the marker accessory to the spreader by means of the pivoting linkage provided by the hinge pin 28 insures that the wheeled container 22 rests on the ground regardless of the evenness of the terrain. Therefore, as the spreader 10 is advanced, the wheel 22 rotates and periodically (as the spreader travels a distance equal to the circumference of the wheel 22) the valve plunger 40 comes in contact with the ground.

Figure 4:
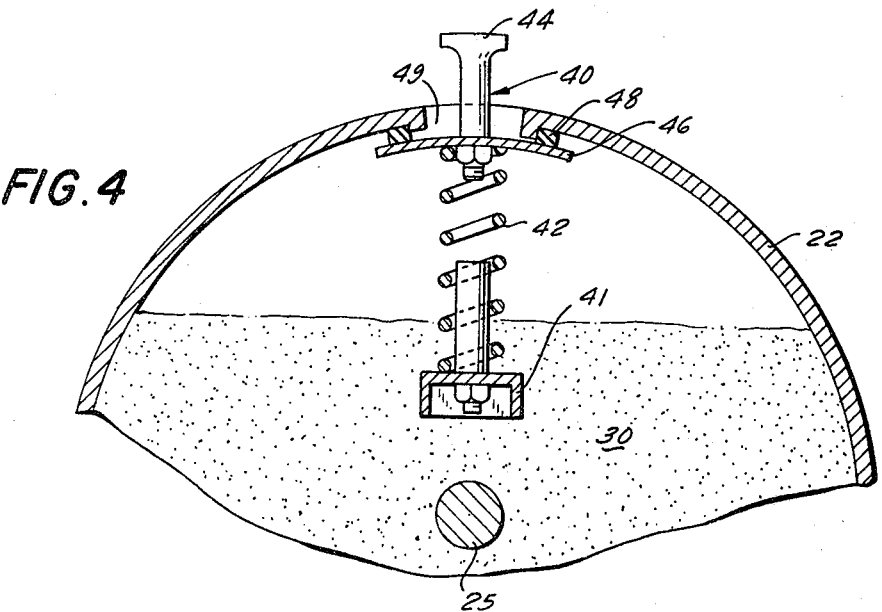
FIG. 4 is a partial cross-section view of the wheeled container portion of the marker accessory showing one form of the valve in the closed position.
Figure 5:
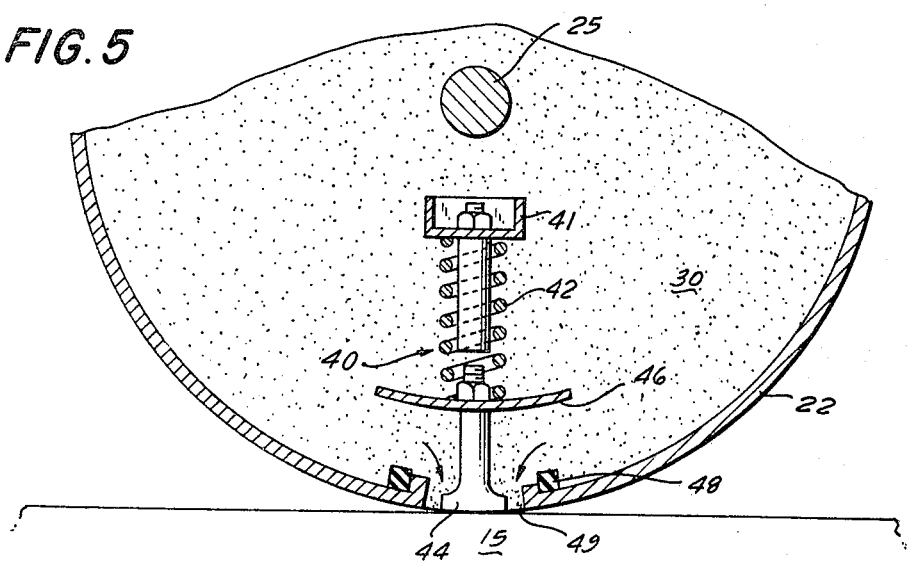
FIG. 5 is a partial cross-section view of the wheeled container with the valve of FIG. 4 shown in the opened position.

As shown in the detail sectional views of FIGS. 4 and 5 illustrating the valve 40 in respective closed and open positions, the dispensing outlet 49 for the marking substance 30 is kept closed by the extension force of a coil spring 42 during times when the radial plunger pin 44 is not depressed through contact with the ground 15. While the valve is closed a hermetic seal is maintained by the pressure of the circular flange plate 46 attached to the free end of the spring 42 forcing against the O-ring gasket 48. The coil spring 42 is mounted at its restrained end to a bracket post 41 which is rigidly secured to one of the inner disc walls of the cylindrical container 22.

As shown in FIG. 5, when the plunger valve 40 comes in contact with the ground 15 as the wheeled container 22 is rotationally advanced, the plunger pin 44 is depressed inward against the spring 42 by the weight of the wheel and an annular area around the outlet 49 is exposed so as to permit a small portion of the marking contents 30 to be deposited. As soon as the rotary travel of the wheel 22 brings the plunger pin 44 out of contact with the ground surface 15, the valve 40 closes and the container is resealed. Thus it is only when the plunger pin 44 of the valve 40 is resting underneath the weight of the wheel 22 and in contact with the ground that the contents 30 of the container are exposed to the ambient environment. At all other times, the container is hermetically sealed by the plunger valve 40 and the entry of moisture and foreign matter is excluded.

Figure 6:
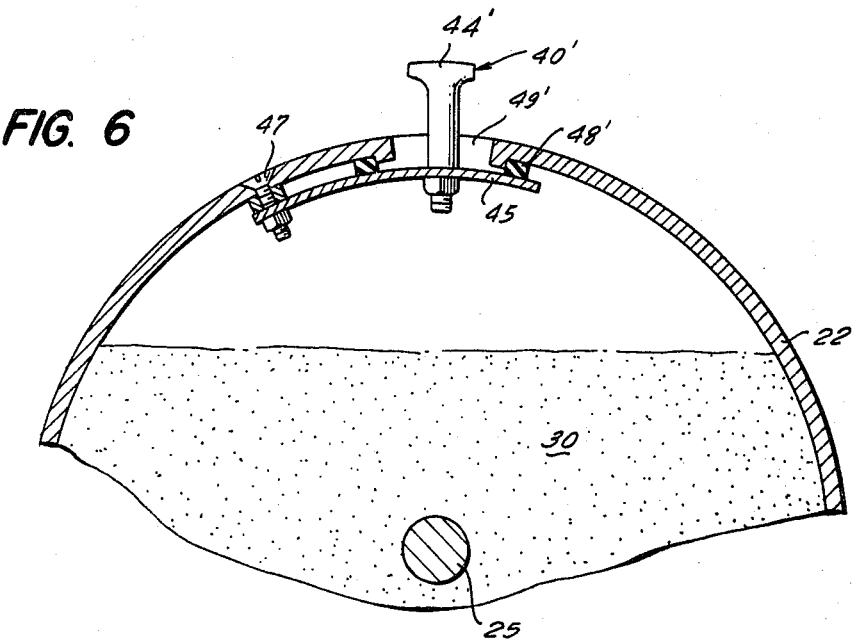
FIG. 6 is a partial cross-sectional view of the wheeled container portion of the marker accessory showing a modified form of the valve in the closed position.
Figure 7:
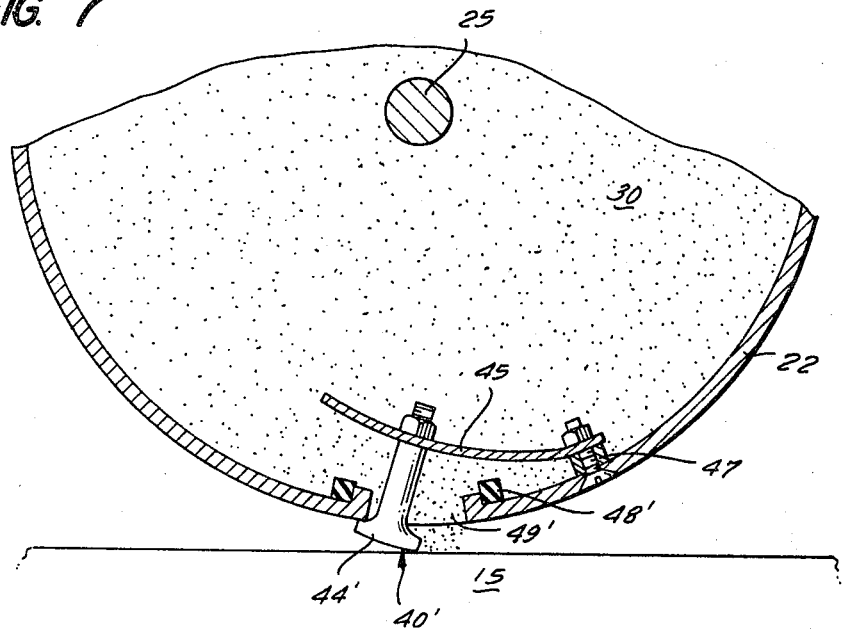
FIG. 7 is a partial cross-sectional view of the wheeled container portion of the marker with the modified valve of FIG. 6 shown in the opened position.

FIGS. 6 and 7 show a modification of the plunger valve for the wheel portion of the marker device which is of somewhat more economical design due to its simpler construction and assembly. In this modification the plunger valve 40' is formed from a leaf spring secured to the inside peripheral surface of the cylindrical container 22. As shown in the figures, the plunger pin 44' is secured to the free end of a metal spring element 45, the other end of which is affixed to the peripheral wall of the container 22 by a screw fastener means 47. In the closed position of the plunger the spring action of the metal member 45 forces itself into sealing engagement with the O-ring gasket 48 and blocks the outlet 49' so as to prevent the entry of moisture and other matter from the outside.

As the wheeled container 22 advances, a point is reached where the plunger pin 44' contacts the ground and is depressed inward by the weight of the container. As shown in FIG. 7, by reason of the restraint provided by the leaf spring 45, the plunger pin 44' is depressed arcuately as well as radially so that it tilts against the side wall of the outlet opening 49'. (It will be appreciated of course that, by suitable dimensioning of the height of the plunger pin 44', the size of the dispenser outlet 49', and the length of the leaf spring member 45, a full inward depression of the plunger pin without making contact with the side walls of the opening 49' could be effected, if desired.) The depression of the plunger pin 44' opens the dispenser outlet 49' and, as before, permits a portion of the marking contents 30 to pass through and be deposited on the ground surface 15.

Figure 8:
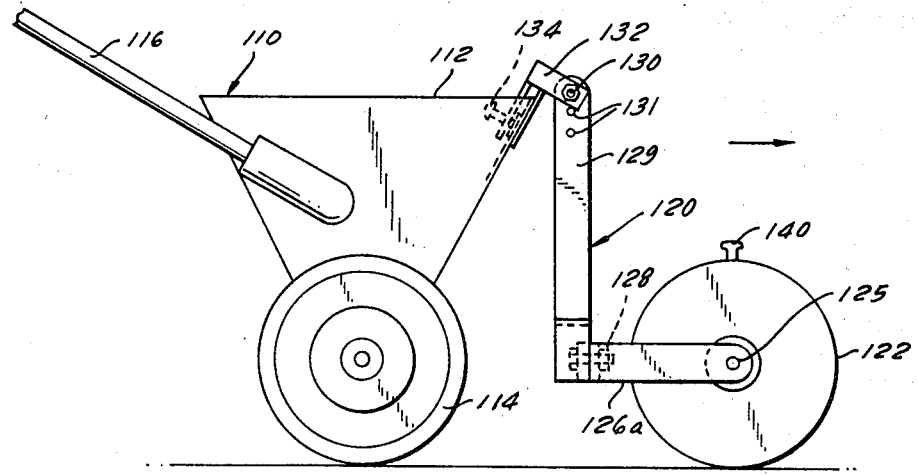
FIG. 8 is a side view of a second embodiment of the marking accessory of the present invention attached to a spreader.
Figure 9:
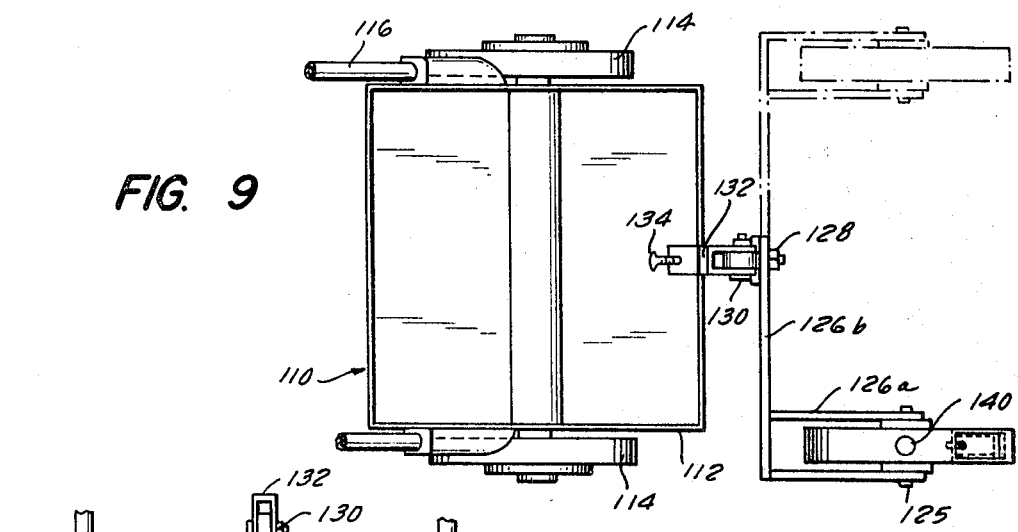
FIG. 9 is a top plan view of the marker accessory with spreader of FIG. 8, with phantom lines indicating the alternative operating position of the marker.
Figure 10:
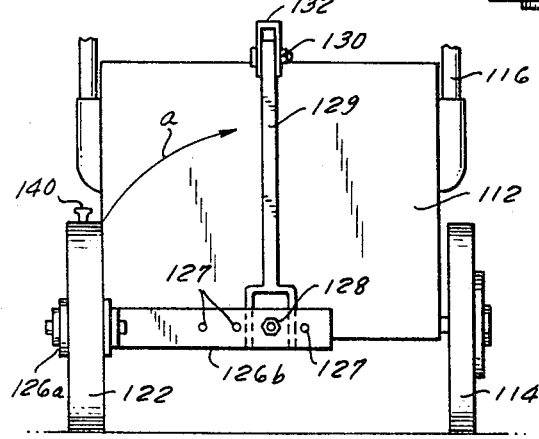
FIG. 10 is a rear view of the marker accessory with spreader of FIG. 8.

FIGS. 8-10 show a further embodiment of the lawn marker accessory of the present invention which is of more versatile design and which particularly facilitates the accurate marking of the rows traced by the spreader, so as to avoid gaps and overlapping of areas. In FIG. 8 the marker accessory, designated generally as 120, is shown coupled to a lawn spreader 110 of conventional design in the form of a hopper 112 carried on a pair of wheels 114 and guided by a handle bar 116. The container portion of the guideline marker is in the form of a hollow cylindrical structure 122 with a spring-pluger dispensing valve 140 and may be of the same construction as that shown in the previous embodiment using either of the coil or leaf spring valving arrangements disclosed previously.

The principal difference in this embodiment over the one previously disclosed is in the nature of the coupling linkage connecting the wheeled container 122 to the spreader 110.

In this embodiment several adjustments are provided in order to permit the marker accessory to be adaptable to lawn and field spreaders of various sizes and configurations. The linkage comprises a U-shaped yoke 126a which at 125 rotatably supports the wheeled container 122. The base of the U-shaped yoke 126a is extended at right angles to form a laterally projecting arm 126b. The distal end of the arm 126b is pivotally secured by bolt 128 to the yoke end portion of a vertical member 129. The member 129 in turn is connected by a bolt fastener 130 to a connector 132 which is clamped by thumb screw 134 to a side wall or other suitable portion of the spreader 110 in similar fashion to that discussed previously.

By reason of the three-bar linkage, formed by arm 126b, vertical member 129, and clamping connector 132, several degrees of freedom are present which permit the marker accessory to be readily adapted for use with spreaders of different size and configuration. For example, adjustment of the marker to fit a wide range of spreader widths is effected by the provision of a plurality of lateral spacing holes 127 (see FIG. 10) on the arm 126b to which the vertical arm 129 can be selectively connected. The bolt fastener 128 which couples these two links together is adjusted to permit free turning action, so that the wheeled container 122 automatically adapt to rolling or uneven terrain, and also so that the marker may be swung over 180° to the alternate position for a purpose which will shortly be described. Vertical adjustment of the marker is provided by a plurality of spacing holes 131 (see FIG. 8) which permit the device to be readily adjusted to spreaders of different heights. Connector bolt 130, after initial adjustment is made for the wall angle of the spreader, typically would be tightened down so as to lock the vertical member 129 rigidly to the clamping connector 132.

The portion of the marker assembly comprising the wheeled container 122 and the yoke arm 126a, b can be readily rotated about the pivot pin 128 so as to place the marker wheel on the other side of the spreader 110 when the direction of travel is reversed at the end of a row. Thus, for example, if the marker accessory is clamped to the center of the spreader midway between its wheels, and the lateral extension of the wheel 122 is adjusted by means of the spacing holes 127 so as to lie directly behind the left-hand wheel of the spreader as shown in FIG. 10, then, when the direction of the spreader is reversed, the marker wheel may be easily swung over a half circle about the pivot pin 128, as indicated by the arrow a, and will then lie directly behind the right-hand wheel of the spreader, as shown in the phantom lines of FIG. 9. This manner of operation of the marker produces a guideline which provides an accurate indication of the spreader width and also permits a constant row spacing to be readily maintained as the spreader moves alternately back and forth over the field area being treated, thereby minimizing the possibility of gaps or overlapping occurring between rows.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

I claim:

1. A guideline marker accessory for a lawn spreader comprising:

(a) A hollow container of generally squat cylindrical configuration holding marking material therein and having at least one discharge aperture in the cylindrical wall thereof, (b) A normally-closed valve means including a spring provided adjacent said aperture, said valve hermetically sealing said container when said valve is in the closed position, and actuated to an open position by the inward depression into said container of a plunger pin radially projecting outwardly from the cylindrical wall of said container, the base of said plunger pin being attached to the free end of the spring which is fiixedly secured at its other end to an interior portion of said container, said plunger pin being retractable to a position substantially within said container, and (c) A yoke element coupled to said spreader and pivotally supporting said container at the center thereof for rotation about a horizontal axis, with the cylindrical wall of said container resting on the surface to be treated and aligned at right angles to the path of travel of said spreader, whereby the travel of said spreader causes said container to roll and to periodically bring said plunger pin into operative contact with said surface, thereby opening said valve and dispensing said marking material from said container through said discharge aperture at regular spaced intervals along the path of said spreader.

2. The guideline marker accessory of claim 1 characterized in that said valve means comprises: a radially-aligned compression coil spring fixedly secured at one end to an interior portion of said cylindrical container; a covering plate with one side secured to the free end of said spring and the other side attached to the base of said projecting plunger pin; and a resilient gasket element placed around the periphery of said discharge aperture and against which said covering plate is urged by said spring.

3. The guideline marker accessory of claim 1 characterized in that said valve means comprises: a leaf spring with its fixed end secured to the interior cylindrical wall of said container at a point adjacent said discharge aperture and its free end fastened to the base of said plunger pin; and a resilient gasket element placed around the periphery of said discharge aperture and against which said leaf spring is urged.

4. The guideline marker accessory of claim 1 characterized in that said yoke element is coupled to said spreader by a horizontal free-turning pivot joint which permits the full weight of said container to continually rest on the surface being treated, regardless of the unevenness of the terrain.

5. The guideline marker accessory of claim 4 further characterized in that the connection of said yoke element to said spreader is provided by a clamp-on fastener in the form of a C-shaped yoke element fitted with a set screw.

6. A guideline marker accessory for a lawn spreader comprising:

(a) A hollow container of generally squat cylindrical configuration holding marking material therein and having at least one discharge aperture in the cylindrical wall thereof, (b) A normally-closed valve means including a spring provided adjacent said aperture, hermetically sealing said container when said valve is in the closed position, and actuated to an open position by the inward depression of a plunger pin radially projecting outwardly from the cylindrical wall of said container, the base of said plunger pin being attached to the free end of the spring which is fixedly secured at its other end to an interior portion of said container, said plunger pin being retractable to a position substantially within said container, (c) A yoke element pivotally supporting said container at the center thereof for rotation about a horizontal axis, with the cylindrical wall of said container resting on the surface to be treated and aligned at right angles to the path of travel of said spreader, said yoke having a base end in the form of an arm extending out laterally in a direction parallel to the axis of rotation of said container, and (d) A bar linkage with one end coupled to said spreader and the other end pivotally connected to said projecting yoke arm, the combination of the yoke element and bar linkage permitting the container to rest on the surface to be treated and be aligned substantially adjacent to one edge of said spreader while rolling in one direction along a row, and then to be swung over 180° about the pivot connection of said bar to said yoke arm so as to align said container substantially adjacent the other edge when said spreader is advanced in the other direction along alternate rows, thereby facilitating the maintenance of constant row spacing.

7. The guideline marker accesory of claim 6 characterized in that a plurality of spaced holes are provided along said laterally projecting yoke arm, whereby the pivot connection point of said bar linkage to said arm may be adjusted so as to adapt said accessory to spreaders of differing lateral widths.

8. The guideline marker accessory of claim 7 further characterized in that the end of said bar linkage which is coupled to said spreader is provided with means for adjusting said accessory for spreaders of different heights.

9. The guideline marker accesory of claim 8 further including a clamp-on connector for securing said accessory to a wall of said spreader, said connector being pivotally fastened, with a locking means, to the coupling end of said bar linkage, whereby said accessory can be adjusted for use with spreaders having differing wall angles.

10. The marker accessory of claim 6 additionally including a normally-closed valve means provided in said discharge aperture and actuated by the depression of a plunger pin projecting radially from the cylindrical wall of said container, whereby the travel of said spreader causes said cylindrical container to roll and to periodically bring said plunger pin into operative contact with said surface, thereby opening said valve and dispensing said markng material through said discharge aperture at regular spaced intervals along the path of said spreader.

References Cited
UNITED STATES PATENTS

| | | | |
|---|---|---|---|
| 221,498 | 11/1879 | Beal | 111—90 |
| 2,543,888 | 3/1951 | Bunch | 222—170 X |
| 2,649,793 | 8/1953 | Draves | 172—223 X |
| 3,157,316 | 11/1964 | Garber | 222—169 |
| 3,346,145 | 10/1967 | Sessa et al. | 222—162 X |

ROBERT B. REEVES, *Primary Examiner.*

H. S. LANE, *Assistant Examiner.*

U.S. Cl. X.R.

111—26